(12) United States Patent
Kanamoto et al.

(10) Patent No.: US 10,197,092 B2
(45) Date of Patent: Feb. 5, 2019

(54) BALL BEARING FOR SPINDLE WITH BUILT-IN MOTOR

(71) Applicant: NTN Corporation, Osaka (JP)

(72) Inventors: Takahiro Kanamoto, Mie (JP); Mineo Koyama, Mie (JP); Keisuke Nasu, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/325,241

(22) PCT Filed: Jul. 14, 2015

(86) PCT No.: PCT/JP2015/070101
§ 371 (c)(1),
(2) Date: Jan. 10, 2017

(87) PCT Pub. No.: WO2016/013443
PCT Pub. Date: Jan. 28, 2016

(65) Prior Publication Data
US 2017/0191524 A1   Jul. 6, 2017

(30) Foreign Application Priority Data
Jul. 22, 2014   (JP) .................................. 2014-148451

(51) Int. Cl.
*F16C 33/66* (2006.01)
*F16C 19/06* (2006.01)
(Continued)

(52) U.S. Cl.
CPC ............ *F16C 19/06* (2013.01); *F16C 19/163* (2013.01); *F16C 33/3856* (2013.01);
(Continued)

(58) Field of Classification Search
CPC .. F16C 19/163; F16C 33/3843; F16C 33/385; F16C 33/3856; F16C 33/3887; F16C 33/7846; F16C 33/785
See application file for complete search history.

(56) References Cited

U.S. PATENT DOCUMENTS 3,121,597 A    2/1964  Moran
3,161,448 A *  12/1964 Moran ................ F16C 33/6614
                                                              384/462
(Continued)

FOREIGN PATENT DOCUMENTS

CN   102119281    7/2011
CN   202612385   12/2012
(Continued)

OTHER PUBLICATIONS

International Search Report dated Oct. 13, 2015 in corresponding International Application No. PCT/JP2015/070101.
(Continued)

*Primary Examiner* — Phillip A Johnson
(74) *Attorney, Agent, or Firm* — Wenderoth, Lind & Ponack, L.L.P.

(57) ABSTRACT

An object is to provide a motor-incorporation-spindle ball bearing capable of allowing cooling air which enters inside the bearing of the motor-incorporation-spindle to be discharged smoothly out of the bearing without causing turbulent flow inside the bearing, does not cause a retainer easily to be vibrated, and provides a high level of silent operation. A seal plate has a length to allow air to pass through the bearing from an entrance side toward an exit side substantially straightly without resistance. Therefore, the seal plate is less likely to be exposed to unnecessary force when the air passes through the bearing; the seal plate is prevented from wobble and deformation; stable sealing is ensured; the air is (Continued)

discharged smoothly without causing turbulent flow inside the bearing; a retainer is not easily vibrated, and silent operation is maintained.

8 Claims, 4 Drawing Sheets

(51) Int. Cl.
*F16C 33/58* (2006.01)
*F16C 33/78* (2006.01)
*F16C 37/00* (2006.01)
*F16C 19/16* (2006.01)
*F16C 33/38* (2006.01)
*F16C 19/54* (2006.01)

(52) U.S. Cl.
CPC .......... *F16C 33/583* (2013.01); *F16C 33/585* (2013.01); *F16C 33/6614* (2013.01); *F16C 33/6629* (2013.01); *F16C 33/6633* (2013.01); *F16C 33/7846* (2013.01); *F16C 33/7869* (2013.01); *F16C 37/007* (2013.01); *F16C 19/542* (2013.01); *F16C 19/547* (2013.01); *F16C 2240/80* (2013.01); *F16C 2322/39* (2013.01); *F16C 2380/26* (2013.01)

(56) References Cited

U.S. PATENT DOCUMENTS

| | | | |
|---|---|---|---|
| 4,502,739 A | 3/1985 | Flander | |
| 5,435,654 A * | 7/1995 | Ishida | F16C 33/783 |
| | | | 384/488 |
| 5,577,845 A * | 11/1996 | Ishida | F16C 33/785 |
| | | | 277/410 |
| 2003/0026509 A1* | 2/2003 | Yakura | F16C 19/163 |
| | | | 384/484 |
| 2010/0327686 A1 | 12/2010 | Gardelle et al. | |
| 2011/0142388 A1 | 6/2011 | Maejima et al. | |
| 2013/0322802 A1 | 12/2013 | Maejima et al. | |
| 2014/0153853 A1* | 6/2014 | Yoshizaki | F16C 19/02 |
| | | | 384/463 |

FOREIGN PATENT DOCUMENTS

| | | | | |
|---|---|---|---|---|
| EP | 2 205 878 | | 7/2010 | |
| JP | 58-113631 | | 7/1983 | |
| JP | 06-173956 | | 6/1994 | |
| JP | 11-002248 | | 1/1999 | |
| JP | 11-257363 | | 9/1999 | |
| JP | 2000-291674 | | 10/2000 | |
| JP | 2003-49857 | | 2/2003 | |
| JP | 2003-287031 | | 10/2003 | |
| JP | 2005-199828 | | 7/2005 | |
| JP | 2006-077918 | | 3/2006 | |
| JP | 2006-161882 | | 6/2006 | |
| JP | 2008-151181 | | 7/2008 | |
| JP | 2009-92127 | | 4/2009 | |
| JP | 3150371 | | 5/2009 | |
| JP | 2009-216240 | | 9/2009 | |
| JP | 2009-275719 | | 11/2009 | |
| JP | 2010196845 A * | 9/2010 | .......... F16C 33/6696 |
| JP | 2011256914 A * | 12/2011 | .......... F16C 33/6674 |
| JP | 2013-63727 | | 4/2013 | |
| JP | 2014-070669 | | 4/2014 | |
| WO | 2009/059979 | | 5/2009 | |
| WO | WO-2013110319 A1 * | 8/2013 | .......... F16C 33/6625 |

OTHER PUBLICATIONS

International Preliminary Report on Patentability dated Feb. 2, 2017 in corresponding International Application No. PCT/JP2015/070101 (with English translation).
Extended European Search Report dated May 25, 2018 in European Application No. 15824733.8.
Office Action dated May 3, 2018 in Chinese Patent Application No. 201580039987.0, with English Translation.

* cited by examiner

BALL BEARING FOR SPINDLE WITH BUILT-IN MOTOR

TECHNICAL FIELD

The present invention relates to ball bearings for small spindles, and particularly those for motor-incorporation spindles.

BACKGROUND ART

Small spindles are used mainly in light-load machining such as working on aluminum.

In recent years, an increasing number of small spindles is of a type where a motor 2 is incorporated in a housing 1 as shown in FIG. 6 (Patent Literature 1) for a purpose of compactness. In FIG. 6, a symbol W represents a workpiece.

Motor-incorporating-spindle of this kind often makes use of angular ball bearings as ball bearings 3 since high speed operation is required.

CITATION LIST

Patent Literature

Patent Literature 1: JP-U3150371 Gazette
Patent Literature 2: JP-A 2005-199828 Gazette
Patent Literature 3: JP-A 2013-063727 Gazette

SUMMARY OF INVENTION

Technical Problem

In a motor-incorporating-spindle in which the motor 2 is included inside the housing 1 of the spindle, the motor 2 and its surroundings are a heat source, so it is necessary to cool the motor 2, and the bearings 3 as well.

Using liquid for cooling inside the housing 1 of the spindle requires complicated structure to ensure sealing for example. In addition, it is often difficult in terms of space.

For these reasons, air, which does not require complicated structure, is mainly used as a primary medium to cool inside the housing 1 of the motor-incorporating-spindle.

The air for cooling inside the housing 1 of the spindle enters from an air vent 4 provided in the housing 1 of the spindle, cools the motor 2 and then the bearing 3 from rear side, and is discharged from a front end of the housing 1 of the spindle, to outside of the housing 1 of the spindle.

The front end of the housing 1 of the spindle also serves as a seal against flying objects. By means of an air curtain and labyrinth sealing which increases pressure inside the housing 1 of the spindle, cutting fluid, machining dust, etc. are prevented from entering the housing 1 of the spindle.

The air for cooling inside the housing 1 of the spindle can pass through the bearing 3, and this causes problems as described below:

Specifically, the bearing 3 used for the motor-incorporating-spindle has its inside filled with grease which serves as a lubricant, and as shown in FIG. 4, has its both ends sealed by seal plates 5. When the air for cooling inside the housing 1 of the spindle passes through the bearing 3, the grease can leak outside.

Losing the grease to the outside can affect durability of the bearing.

Also, conventionally, as shown in FIG. 4, an inner diameter portion of the sealing plate 5 and an outer diameter portion of an inner ring 6 make a labyrinth structure, and the inner diameter portion of the sealing plate 5 is fitted into a sealing groove 7 which is provided in the outer diameter portion of the inner ring 6. In FIG. 4, a reference symbol 8 indicates a retainer, a symbol 9 indicates an outer ring, and a symbol 10 indicates a rolling element.

In the labyrinth structure described above, the sealing plate 5 tends to prevent the air inside the bearing 3 from being discharged. As shown by arrows in FIG. 4, the air inside the bearing 3 can become turbulent inside the bearing 3, causing the retainer 8 to vibrate.

The vibration of the retainer 8 is transmitted to the housing 1 of the spindle, which adversely affects silence in operation.

Therefore, an object of the present invention is to provide a motor-incorporating-spindle ball bearing which is capable of allowing cooling air which enters inside the bearing of the motor-incorporating-spindle to be discharged smoothly without causing turbulent flow inside the bearing, so that the retainer is not easily vibrated, and silent operation is maintained.

Solution to Problem

In order to achieve the above object, the present invention provides a motor-incorporation-spindle ball bearing which includes: an inner ring; an outer ring; rolling elements disposed between mutually opposed rolling surfaces of the inner ring and the outer ring; a retainer which holds the rolling elements; and a seal plate extending toward the inner ring from an inner diameter surface on each end of the outer ring, wherein the seal plate has a radially inward length in dimension to allow air to pass through the bearing from an entrance side toward an exit side substantially straightly without resistance.

Further, the inner ring may have a straightly formed outer diameter surface faced by an inner diameter portion of the seal plate.

Advantageous Effects of Invention

According to the motor-incorporation-spindle ball bearing offered by the present invention, as described above, the seal plate has a radially inward length in dimension to allow air to pass through the bearing from an entrance side toward an exit side substantially straightly without resistance. Therefore, the invention makes it possible that the seal plate is less likely to be exposed to unnecessary force when the air passes through the bearing; that the seal plate is prevented from wobble and deformation; that stable sealing is ensured. Also the invention makes it possible that the air is discharged smoothly without causing turbulent flow inside the bearing; that the retainer is not easily vibrated, maintaining silent operation.

Further, by making the inner ring's outer diameter surface, which faces the inner diameter portion of the seal plate, straight, the invention allows the air to pass more smoothly.

DESCRIPTION OF EMBODIMENTS

Hereinafter, embodiments of the present invention will be described based on the attached drawings.

Figure 1:
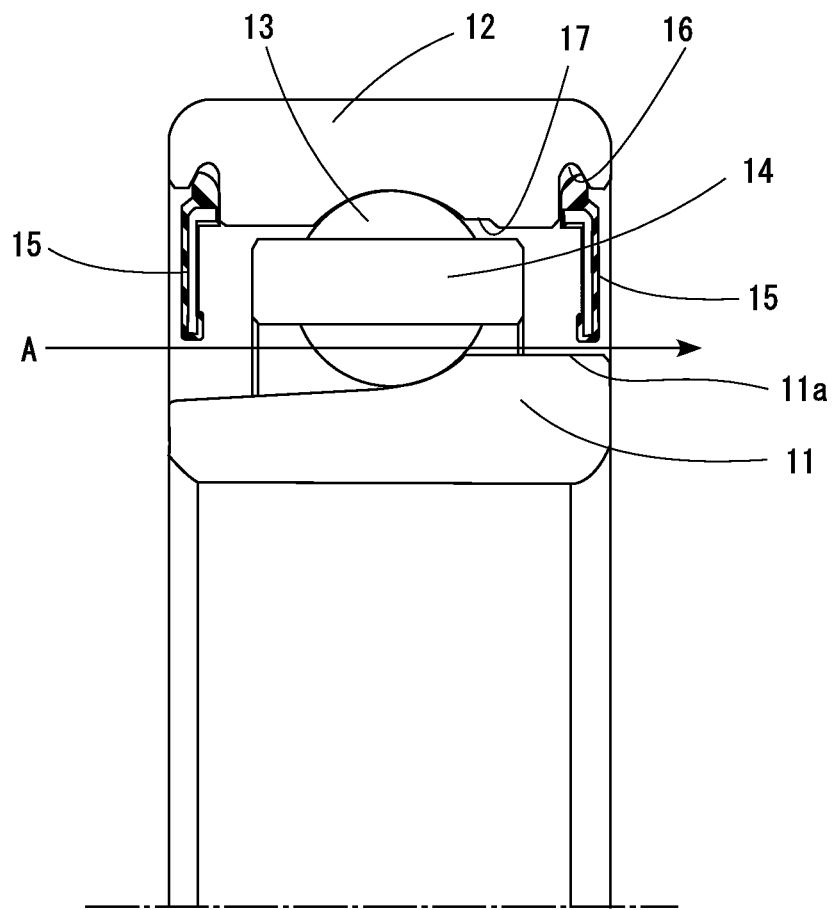
FIG. 1 is a partial, sectional view of a motor-incorporation-spindle ball bearing according to the present invention.

As shown in FIG. 1, a motor-incorporating-spindle ball bearing according to an embodiment of the present invention is an angular ball bearing.

The angular ball bearing according to the present invention includes: an inner ring 11; an outer ring 12; rolling elements 13 between mutually opposed rolling surfaces of the inner ring 11 and the outer ring 12; a retainer 14 which holds the rolling elements 13; and seal plates 15 on both end surfaces of the inner ring 11 and the outer ring 12.

The seal plate 15 is fitted in a mounting groove 16 which is provided in an inner diameter surface of the outer ring 12.

Figure 4:
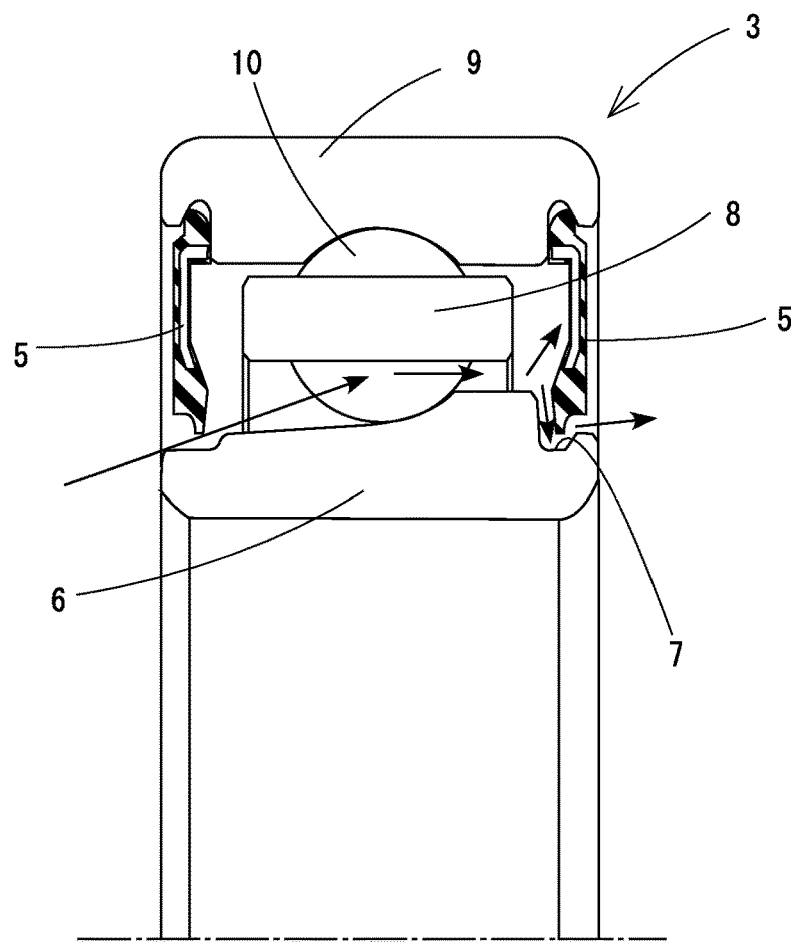
FIG. 4 is a partial, sectional view of a conventional motor-incorporation-spindle ball bearing.

An outer diameter surface 11a of the inner ring 11, which faces an inner diameter portion of the seal plate 15, is straight as shown in FIG. 1, and unlike the conventional bearing shown in FIG. 4, does not have a seal groove which provides a labyrinth structure between the inner diameter portion of the seal plate 15 and the outer diameter surface 11a of the inner ring 11.

As indicated by an arrow A in FIG. 1, in order to allow air to pass substantially straightly without resistance, from an air inlet toward an air outlet, the seal plate 15 extends radially inward by a predetermined length, whereby a gap between the outer diameter surface of the inner ring 11 on the outlet side and the inner diameter portion of the seal plate 15 has a projected area which is substantially equal to a projected area of an air path formed through the bearing.

In light of a flow pass resistance at a time when the air passes through, this radially inward length of the seal plate 15 should only be such that the projected area is about 10% smaller than the projected area of the flow path for the air that passes through the bearing.

By making the radially inward length of the seal plate 15 as described above so that the gap between the inner diameter portion of the seal plate 15 and the outer diameter surface of the inner ring 11 opposed thereto has a projected area which allows the air to pass substantially straightly without resistance, the invention makes it possible that the seal plate 15 is less likely to be exposed to unnecessary force when the air passes through the bearing; that the seal plate 15 is prevented from wobble and deformation; and that stable sealing is ensured. As long as this condition is satisfied, the gap between the inner diameter portion of the seal plate 15 and the outer diameter surface of the inner ring 11 opposed thereto may be increased, but should desirably be smaller than an inner diameter of the retainer 14 so as to prevent leakage of lubricant from inside the bearing.

Further, in order to allow the air to pass through with a smaller resistance, it is desirable that the outer diameter surface 11a of the inner ring 11 which faces the inner diameter portion of the seal plate 15 is formed straightly.

Figure 2:
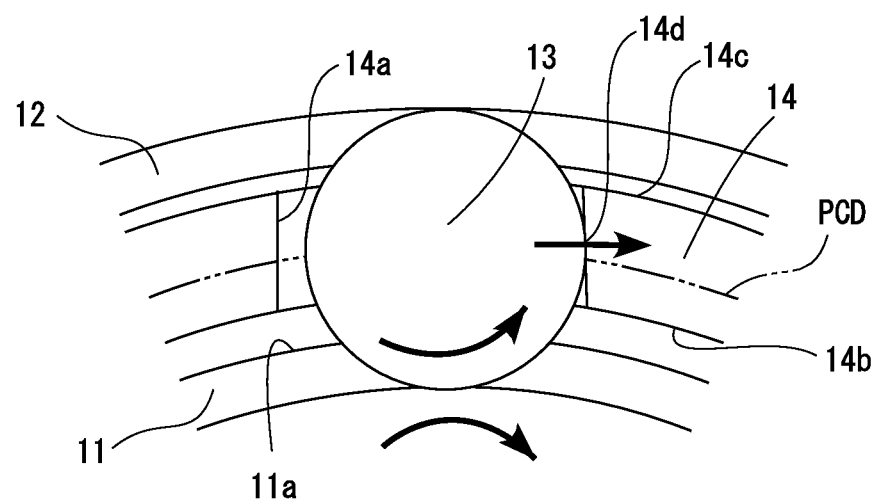
FIG. 2 is a partial, enlarged view which shows a state where a retainer of the motor-incorporation-spindle ball bearing according to the present invention is guided.
Figure 3:
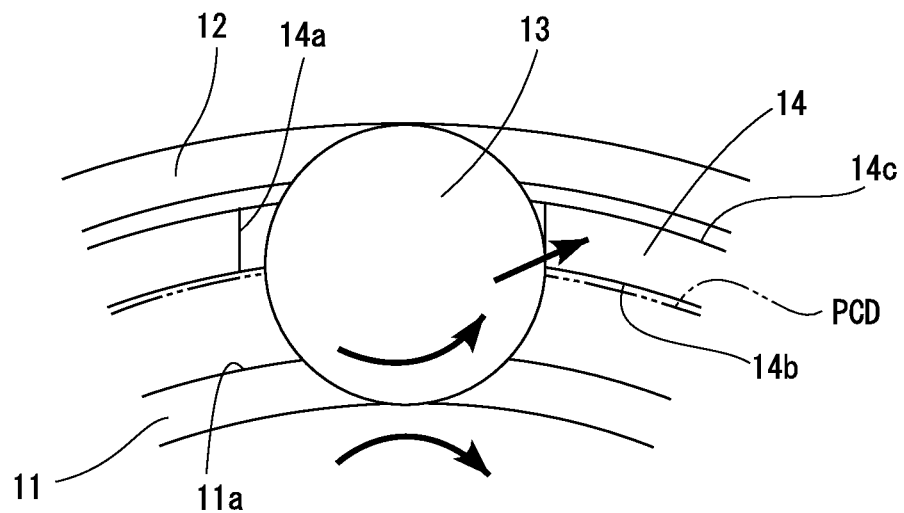
FIG. 3 is a partial, enlarged view which shows a state where a retainer of a motor-incorporation-spindle ball bearing according to another embodiment of the present invention is guided.

FIG. 2 and FIG. 3 are partial, enlarged views each showing a state where a retainer 14 of the motor-incorporation-spindle ball bearing according to the present invention is guided. In FIG. 2 and FIG. 3, alternate long and two short dashes lines represent a pitch circle diameter (PCD) of the rolling element 13, whereas a reference symbol 14a represents a pocket which holds the rolling element 13.

It is preferable that Dimension d of an inner diameter portion 14b of the retainer 14 is made as large as possible so as to allow the air to pass with less resistance. However, increasing the inner diameter portion 14b of the retainer 14 decreases strength of the retainer 14, so it is preferable that Dimension d of the inner diameter portion 14b of the retainer 14 satisfies the following equation, where D represents a dimension of the outer diameter portion 14c of the retainer 14, Q represents a load received by the rolling element 13, μ represents a friction coefficient between the rolling element 13 and track rings, σ represents an acceptable tensile strength of a resin material of the retainer 14, and B represents a total axial thickness of the retainer 14.

$$d \leq D - (4*Q*\mu)/(\sigma*B)$$

Next, it is preferable that Dimension d of the inner diameter portion 14b of the retainer 14 is larger than an inner diameter of the seal plate 15 in order not to disturb the air flow. More preferably, as shown in FIG. 2, a circumferential contact area 14d of a pocket 14a of the rolling retainer 14 should make contact with the rolling element 13 at a radially more outward point than the PCD of the rolling element 13. This arrangement, where the circumferential contact area 14d of the pocket 14a of the retainer 14 makes contact with the rolling element 13 at a radially more outward point of the PCD of the rolling element 13, provides as shown by bold arrows, that as the rolling element 13 moves in a circumferential direction, the retainer 14 is always under a radially outward force, creating a gap between the retainer 14 and the outer diameter surface 11a of the inner ring 11; namely, air flow is not restricted.

As shown in FIG. 3, the retainer 14 may be made so that its inner diameter portion 14b is at a radially more outward point than the PCD of the rolling element 13 thereby keeping the retainer 14 always under a radially outward force as the rolling element 13a makes a circumferential movement.

Figure 5:
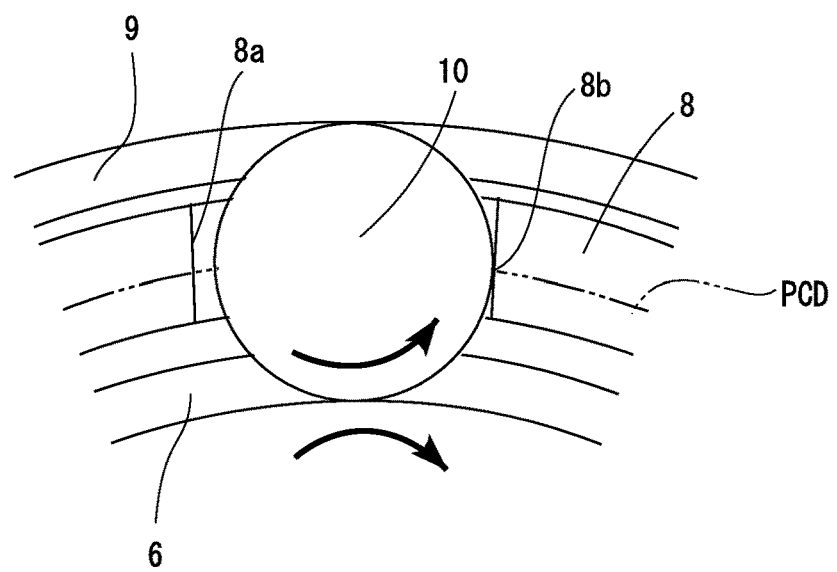
FIG. 5 is a partial, enlarged view which shows a state where a retainer of the conventional motor-incorporation-spindle ball bearing is guided.
Figure 6:
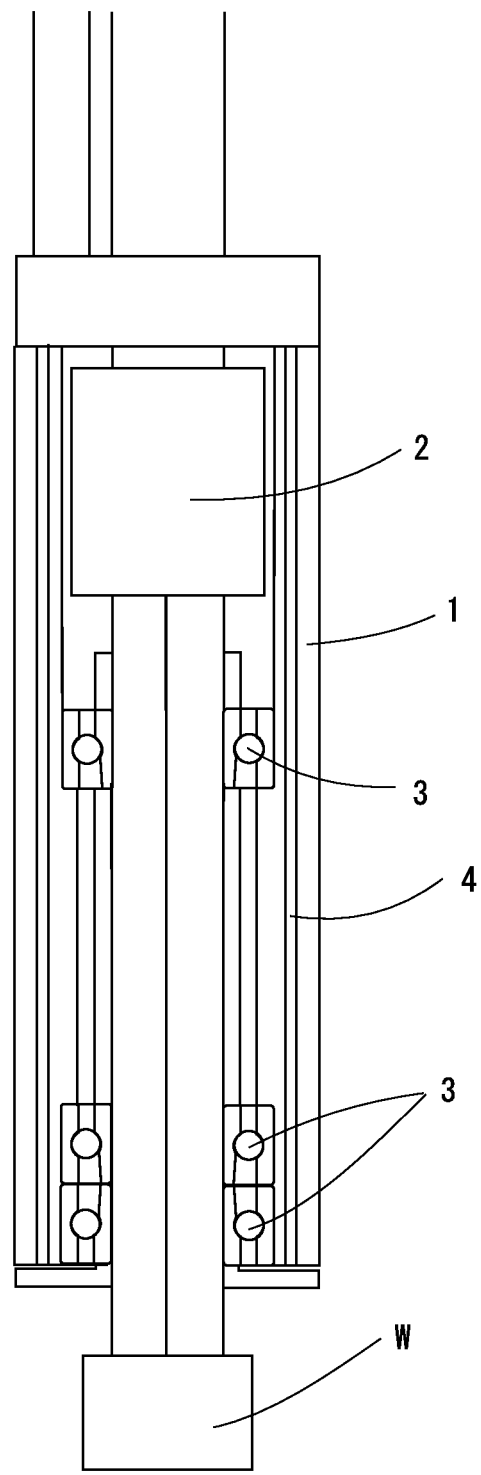
FIG. 6 is a schematic illustration of a motor-incorporation-spindle.

In other words, in a conventional example shown in FIG. 5, a retainer 8 makes contact with a rolling element 10 at a circumferential contact area 8b of its pocket 8a, i.e., on a PCD of the rolling element 10. However, in the embodiment of the present invention shown in FIG. 2, the circumferential contact area 14d of the pocket 14a of the retainer 14 which makes contact with the rolling element 13 is at a radially more outward side than the PCD of the rolling element.

In the embodiment shown in FIG. 1, a grease pocket 17 is provided as part of the outer ring, for stable lubricant supply between the track ring of the outer ring 12 and the rolling element 13, and between the track ring of the outer ring 12 and the retainer 14.

In cases where the angular ball bearings according to the present invention are disposed back to back with each other in two rows, the bearing has each of its right and left sides formed with the grease pocket 17 since the bearings face in different directions from each other in two rows with respect to the air flow.

Grease takes up to 40 through 50% of a static space. If the rate is lower than 40%, grease distribution becomes non-uniform due to air pressure, leading to unstable durability. If it is higher than 50%, rotation becomes unstable as grease distribution becomes non-uniform due to air pressure, causing excessive local re-circulation of grease, leading to excessive temperature fluctuation and vibration fluctuation.

The grease preferably has a base-oil-viscosity between 20 through 40 mm²/s.

REFERENCE SIGNS LIST

11 Inner Ring
11a Outer Diameter Surface
12 Outer Ring
13 Rolling Element
14 Retainer
14a Pocket
14b Inner Diameter Portion
14c Outer Diameter Portion
14d Circumferential Contact Portion
15 Seal Plate
16 Mounting Groove
17 Grease Pocket

The invention claimed is:

1. A motor-incorporation-spindle angular ball bearing comprising:
an inner ring;
an outer ring;
rolling elements between mutually opposed rolling surfaces of the inner ring and the outer ring;
a retainer which holds the rolling elements; and
a seal plate extending toward the inner ring from an inner diameter surface on each end of the outer ring;
wherein the seal plate has a radially inward length of a dimension to allow air to pass through the angular ball bearing from an entrance side toward an exit side substantially straightly without resistance, and
wherein the retainer has pockets, each pocket making contact with the rolling element at a circumferential contact area of the pocket which is radially more outward than a PCD of the rolling element.

2. The motor-incorporation-spindle angular ball bearing according to claim 1, wherein the inner ring has a straightly formed outer diameter surface faced by an inner diameter portion of the seal plate.

3. The motor-incorporation-spindle angular ball bearing according to claim 1, wherein the outer ring has an inner diameter portion having grease as a lubricant provided therein.

4. The motor-incorporation-spindle angular ball bearing according to claim 1, wherein the outer ring has an inner diameter portion which is provided with a grease pocket for grease provided therein.

5. A motor-incorporation-spindle angular ball bearing comprising:
an inner ring;
an outer ring;
rolling elements between mutually opposed rolling surfaces of the inner ring and the outer ring;
a retainer which holds the rolling elements; and
a seal plate extending toward the inner ring from an inner diameter surface on each end of the outer ring;
wherein the seal plate has a radially inward length of a dimension to allow air to pass through the angular ball bearing from an entrance side toward an exit side substantially straightly without resistance, and
wherein the retainer has an inner diameter portion which is located at a radially more outward position than a PCD of the rolling element.

6. The motor-incorporation-spindle angular ball bearing according to claim 5, wherein the inner ring has a straightly formed outer diameter surface faced by an inner diameter portion of the seal plate.

7. The motor-incorporation-spindle angular ball bearing according to claim 5, wherein the outer ring has an inner diameter portion having grease as a lubricant provided therein.

8. The motor-incorporation-spindle angular ball bearing according to claim 5, wherein the outer ring has an inner diameter portion which is provided with a grease pocket for grease provided therein.

* * * * *